United States Patent
Brickell (10) Patent No.: US 8,024,575 B2
(45) Date of Patent: Sep. 20, 2011

(54) SYSTEM AND METHOD FOR CREATION AND USE OF STRONG PASSWORDS

(75) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1538 days.

(21) Appl. No.: 11/394,288

(22) Filed: Mar. 30, 2006

(65) Prior Publication Data

US 2007/0192617 A1 Aug. 16, 2007

Related U.S. Application Data (62) Division of application No. 09/607,439, filed on Jun. 29, 2000, now Pat. No. 7,051,209.

(51) Int. Cl.
| | |
|---|---|
| H04K 1/00 | (2006.01) |
| H04L 9/32 | (2006.01) |
| G06F 7/04 | (2006.01) |
| G06F 21/00 | (2006.01) |
| H04L 9/30 | (2006.01) |
| G06F 1/00 | (2006.01) |
| G06F 13/00 | (2006.01) |

(52) U.S. Cl. ............ 713/183; 713/176; 713/184; 726/8; 726/18

(58) Field of Classification Search .................. 713/183, 713/176, 184; 726/8, 18
See application file for complete search history.

(56) References Cited

U.S. PATENT DOCUMENTS

| | | | | |
|---|---|---|---|---|
| 5,991,882 | A * | 11/1999 | O'Connell | 726/18 |
| 6,360,322 | B1 * | 3/2002 | Grawrock | 713/176 |
| 6,401,206 | B1 | 6/2002 | Khan et al. | |
| 6,598,167 | B2 | 7/2003 | Devine et al. | |

FOREIGN PATENT DOCUMENTS

WO   WO 2009110878 A1  *  9/2009

OTHER PUBLICATIONS

David P. Jablon, Strong password-only authenticated key exchange, Oct. 1996, SIGCOMM Computer Communication Review, vol. 26 Issue 5, Publisher: ACM, pp. 5-26.*
Carl Ellison, "Establishing Identity Without Certification Authorities", Proceedings of the Sixth Annual USENIX Security Symposium, San Jose, CA, Jul. 1996, pp. 1-11.*
Jiang Huiping; "Strong password authentication protocols"; Distance Learning and Education (ICDLE), 2010 4th International Conference on Digital Object Identifier: 10.1109/ICDLE.2010.5606044; Publication Year: 2010; pp. 50-52.*

* cited by examiner

*Primary Examiner* — Eleni A Shiferaw
*Assistant Examiner* — Courtney D Fields
(74) *Attorney, Agent, or Firm* — Pillsbury Winthrop Shaw Pittman LLP (57) ABSTRACT

The system and method uses user generated questions and answers of multiple levels for added protection from adversaries. There are a first set of question(s) and answer(s) corresponding to the first set of questions as well as a second set of plurality of questions and answers corresponding to the second set of plurality of questions. The second set of plurality of answers is concatenated to form a single pass phrase. To enter the pass phrase at a client workstation, a user is presented with a plurality of entries for entering the second set of plurality of answers and an option to request a second set of plurality of questions. If the correct first set of answer(s) is entered immediately or entered after the first set of question(s) is displayed, the second set of plurality of questions is displayed.

11 Claims, 7 Drawing Sheets

SYSTEM AND METHOD FOR CREATION AND USE OF STRONG PASSWORDS

RELATED APPLICATIONS

This application is a divisional of U.S. patent application Ser. No. 09/607,439, filed Jun. 29, 2000, now U.S. Pat. No. 7/051,209, and is based upon, and claims the benefit of priority from that patent.

BACKGROUND OF THE INVENTION

1. Field of the Invention

The present invention relates to computer networks and network security, and in particular, to systems and methods for creating and using strong passwords.

2. Related Art

Public networks, such as the Internet, hold tremendous potential for many industries. The public networks provide users with vast amount of data that can be quickly and cost effectively accessed from virtually anywhere. The Internet, for example, allows users to access databases such as web page servers from any computer connected to the Internet.

Along with the emergence of public networks and the content/service providers therein comes an imperative need to preserve the confidentiality of some of the sensitive information supplied by the web page servers. If such measure is not taken, sensitive or private information may be accessed, modified, or intercepted by an unauthorized party. Therefore, web page servers must be able to confirm the identity of their online users or visitors before granting access to private information.

A user identification and password combination has long been used as ways to authenticate a user, and public key cryptographic systems are used to provide digital signatures and encryption. A password often comprises a secret series of characters that enables a user to access a file, computer, or program. On multi-user systems, each user must enter his or her password before the computer will respond to commands. The password essentially helps to determine that a user requesting access to a computer system is really that particular user.

Besides the user identification and password combination, questions and answers combination is also used for authentication and protection purpose. Instead of entering a secret password associated with a user identification, a user is presented with a series of questions and asked to provide answers to the questions. These questions are pre-stored on a remote server, with which the user has previously registered and created the questions and answers corresponding to the questions. Examples of such questions may be inquiries regarding the user's birthday and city of birth. Upon receiving the answers provided by the user, the remote server compares the answers provided by the user with the answers pre-stored on the remote server. If the former answers and the latter answers are the same, the user is granted access to sensitive or private information such as a cryptographic key or private record.

Currently, the market offers implementations of questions and answers to form passwords. However, these questions are released without prior authentication. This allows anyone, including an unauthorized user, to obtain the questions without first being authenticated. The unauthorized person could then do research on the questions to find the answers. Once the unauthorized person obtains the answers to the questions, he/she could use them to impersonate the authorized user and obtain sensitive or private information of the authorized user. For example, one's cryptographic key or private record may be obtained.

Another problem lies in the fact that these present implementations store the actual answers to the questions or the hash of each answer on a remote server that manages access to restricted information. This further exposes the answers from attack within. Therefore, there is a need for a system and method of providing and using strong passwords while avoiding storing actual answers or the hash of each answer in a remote server.

DETAILED DESCRIPTION

Figure 1:
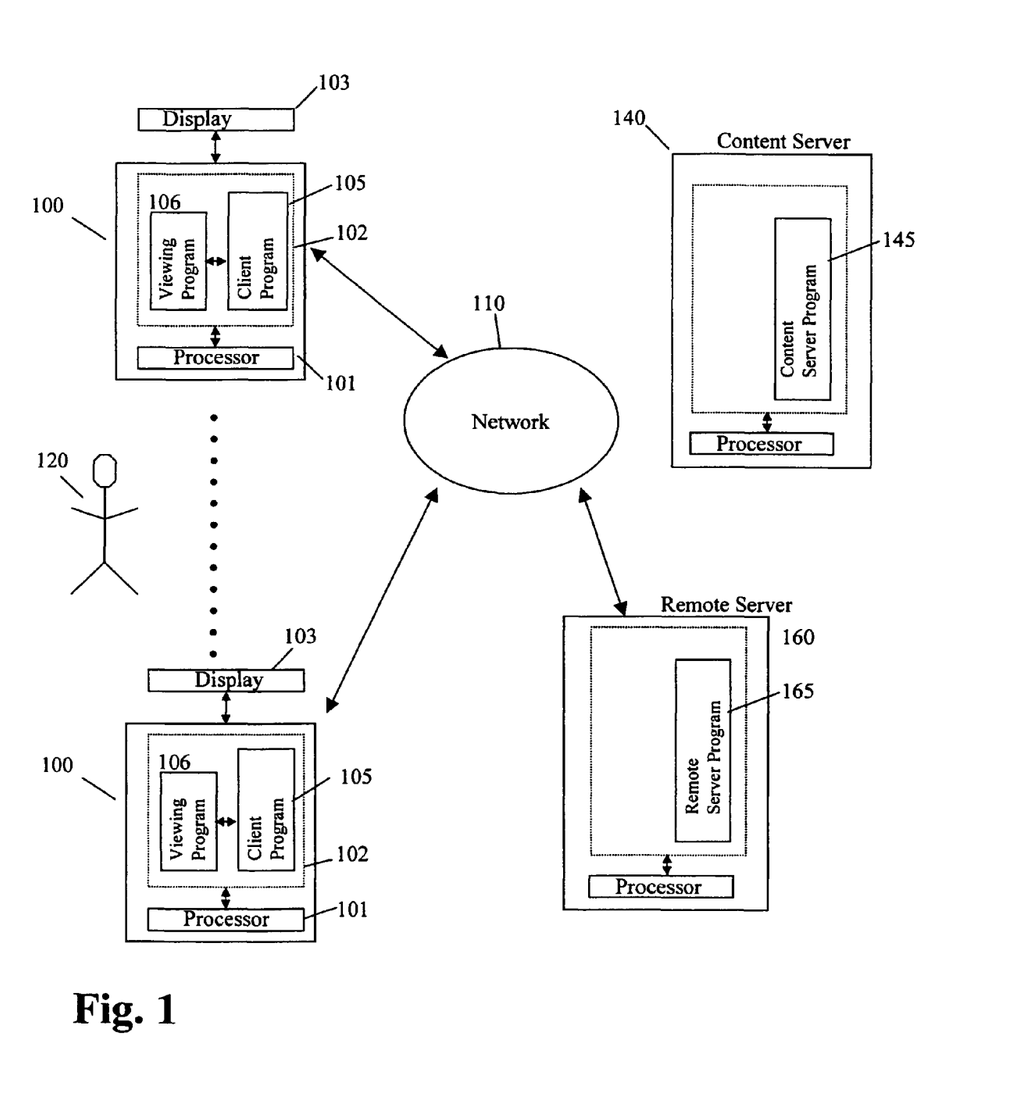
FIG. 1 shows a network environment in which the present systems and methods may function according to an embodiment of the present invention.

Embodiments of the present invention are directed to a system and method of providing and using strong passwords. FIG. 1 is a diagram illustrating an exemplary computer network in which concepts consistent with the present invention may be implemented. According to an embodiment of the present invention, the computer network includes multiple client workstations 100 coupled to network 110, which may be, for example, the Internet. Each client workstation 100 typically includes a processor 101 operatively coupled to computer memory 102 and a display 103. The processor 101 executes program instructions stored in the computer memory 102, such as client program 105 or viewing program 106.

A user 120 may use any of the client workstations 100 to communicate with a remote server 160 or a content server/relying party 140. In general, the remote server 160 assists the user 120 in creating and providing a strong pass phrase. The content server 140 may be a web site wishing to provide encrypted information to the user 120, or more simply, any party that wishes to rely on the authenticity of information received from the user 120. In an exemplary use, the content server 140 accepts the digital credentials issued from a credential issuing service. Information retrieved from the content server 140 or the remote server 160 is rendered by viewing program 106 and displayed to the user 120 via display 103. The user 120 reads the information being displayed and, if required, enter the requested response as dictated by the information being displayed. The viewing program 106 may be, for example, web browser programs such as Microsoft Internet Explorer, available from Microsoft Corporation, of Redmond, Wash.

The remote server 160 includes a remote server program 165, which interacts with the client program 105 at the client workstation 100 or with a content server program 145 at the content server 140 in implementing a strong pass phrase. The remote server program 165 may, for example, provide a credential service and a retrieval service. In general, the credential service authenticates the identity of the user 120 when the user 120 wishes to retrieve questions stored in the remote server 160. The retrieval service assists the user 120 in setting up questions and answers for constructing a strong pass phrase, storing questions and answers (or hash of the answers), and retrieving questions on an as-needed basis when entering a pass phrase.

The client program 105 allows questions and answers to be obtained and information transmitted to the remote server 160, answers to be combined into a single pass phrase, and specific questions to be chosen for display. In addition, the client program 105 may also include the function of encryption, decryption, authentication, and digitally signing of information being transmitted to and received from the content server 140 or the remote server 160. For example, the client program 105 decrypts information from any one of the servers and provides it to the viewing program 106 for display to the user 120. The client program 105 may also encrypt and/or digitally sign information entered by the user 120 before transmitting it to any one of the servers. Although shown as a separate program from the viewing program 106, the client program 105 and the viewing program 106 may be integrated as a single program, which could also include a credential program that authenticates the identity of a user. Moreover, although shown as a single program, the client program 105 may be a multitude of programs each providing part of the functionality of the client program 105.

The client workstations 100, by virtue of their connection to the network 110, may send information or may access and retrieve information stored at the content server 140 or the remote server 160. The content server 140 and the remote server 160 may, for example, be implemented by computers or networks of computers. The content server 140 and the remote server 160 accept information requests, such as requests for content or for creating and/or providing a pass phrase, from the client workstation 100 and transmit requested content to the client workstation 100. In addition, they accept and verify digitally signed messages from the client workstation 100. In one exemplary use, the content server 140 interacts with the remote server 160 to register and authenticate a user's credential.

As with the client workstation 100, each of the servers may include at least one processor and computer memory. The memory includes programs that deal with requests from the client workstation 100. These programs interact with the programs on the client workstation 100, such as the client program 105, to carry out desired functions. Additionally, each of the servers may interact with a database (not shown) to respond to information requests from the client workstation 100. The server program may be a web server program such as any one of a number of well-known web servers. For example, the servers may be an Apache web server, a Netscape server (available from Netscape Communications Corporation, of Mountain View, Calif.), or a Microsoft Internet Information Server. Alternatively, the server program may transmit information to the client workstation 100 in a proprietary, non web page format.

The client workstation 100 and the servers may accept program instructions from a computer storage device (e.g., optical or magnetic disk) or from the network 110. Basic input/output system (BIOS) code (i.e., computer instructions) causing the system to implement the disclosed techniques may be programmed into a non-volatile portion of the computer memory 102. The BIOS may be programmed when the system is manufactured or may be later delivered via a computer readable medium.

The client processor 101 and the processors of the server can be any of a number of well-known devices, such as processors from Intel Corporation, of Santa Clara, Calif. More generally, the client workstation 100 may be any type of computing platform connected to a network which interacts with application programs, such as a personal digital assistant or a "smart" cellular telephone or pager.

In one embodiment, user generated questions and answers are used to produce a pass phrase with high entropy in a way that can be easily remembered by the user 120. To protect against an adversary obtaining the questions and researching the answers, multiple levels of questions and answers are used. There is a single retrieval question and answer, and multiple pass phrase questions and answers. The client program 105 at the client workstation 100 interacts with programs residing at the servers, such as the content server program 145 and/or the remote server program 165, directly or indirectly to perform various functions.

One set of functions relates to creating a pass phrase. These functions include, among other functions, obtaining a plurality of pass phrase questions and pass phrase answers, creating a pass phrase from the plurality of pass phrase answers, obtaining a set of retrieval questions and retrieval answers, creating a single retrieval pass phrase, and transmitting necessary information to the remote server 160 or content server 140.

Another set of functions relates to providing a pass phrase at a client workstation. These functions include, among other functions, displaying a plurality of entries for entering a plurality of pass phrase answers, creating a single pass phrase from the plurality of pass phrase answers, providing an option for displaying a plurality of pass phrase questions pre-stored in the remote server 160, displaying a plurality of pass phrase questions if the user 120 enters a retrieval answer matching the retrieval answer pre-stored in the remote server 160.

In one exemplary use, the pass phrase is used to wrap cryptographic keys. The cryptographic keys may, for example, be fixed keys or roaming keys. In this example, the remote server 160 stores cryptographic keys that are encrypted with the pass phrase. The client program 105 interacts with programs residing at the servers directly or indirectly to further process the pass phrase, wrap the cryptographic keys using the processed pass phrase, and authenticate the user 120 using the processed pass phrase.

Figure 2:
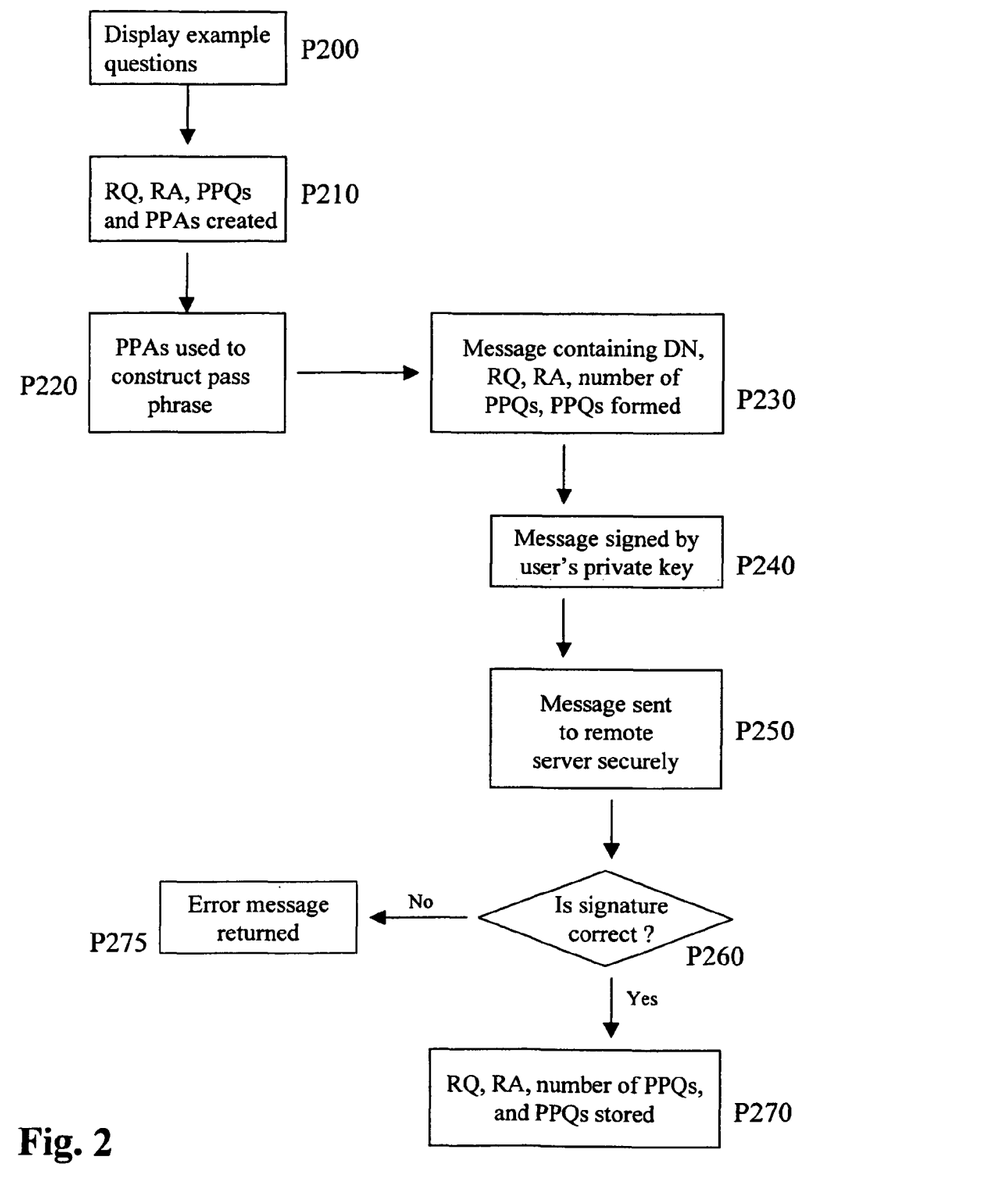
FIG. 2 shows processes for creating a pass phrase according to an embodiment of the present invention.

FIG. 2 illustrates processes for creating a pass phrase with high entropy in a way that can be easily recreated by a user 120. In block P200, the user 120 is presented with a display that gives the user 120 examples of how to pick questions that can be easily remembered. In one implementation, the user 120 is asked to create a retrieval question (RQ) and a certain number of pass phrase questions (PPQs). The user 120 is advised to choose an RQ that he/she is likely to remember, so that the user 120 will rarely be required to see it.

In block P210, the user creates the RQ and a retrieval answer (RA) corresponding to the RQ as well as the PPQs and pass phrase answers (PPAs) corresponding to the PPQs. In one implementation, all the answers, RA and PPAs, are covered with asterisks ("*"), so that someone watching the screen will not see the answers. To ensure that the answers are entered correctly, the user is asked to enter all of the answers twice. If, in any particular answer, a first entered answer does not match with the second entered answer, the user is asked to enter that particular answer twice until a first entered answer matches with a second entered answer.

Upon receiving all the answers, the PPAs are used to construct a pass phrase in block P220. In one implementation, an applet combines the PPAs into a single pass phrase. The applet, such as a small Java application, may be downloaded from the content server 140 or the remote server 160 and run on the client workstation 100 by the viewing program 106 equipped with Java virtual machines. The applet concatenate the PPAs together with a fixed random value and apply a cryptographic hash function to the concatenation. One suitable cryptographic hash function is the 160 bit Secure Hash Algorithm (SHA), which is well known in the cryptographic art. The cryptographic hash function may be repeated multiple times in order to increase the difficulty of a brute force attack on the pass phrase. One suitable method for repeating SHA multiple times is with the Public Key Cryptographic Standard (PKCS) #5 algorithm, available from Rivest-Shamir-Adleman (RSA), Inc., of Bedford, Mass. In one exemplary use, the user's pass phrase is converted into a key for encrypting cryptographic keys by using the PKCS #12 algorithm.

In general, hashing algorithms take arbitrary strings as input, and produce an output of fixed size that is dependent on the input. Ideally, it should never be possible to derive the input data given the hash algorithm's output. For a hashing algorithm to be cryptographically secure, such as the SHA algorithm, it must be very difficult to find two input strings that produce the same output hash value, or to find an input string that produces a given hash value.

On the client workstation 100, a local applet constructs a message that consists of the distinguished name (DN) or credential identification, the RQ, the RA, the number of PPQs, the list of PPQs, and the pass phrase, as shown in block P230. In another embodiment, the message may include more, fewer, or different items. For example, the message may include a hash of the RA or a single retrieval pass phrase created from the RA in place of the RA, or the message may not include the number of PPQs. In block P240, this message is signed by the user's private key.

In block P250, the message and signature are routed to a remote server 160 in a secure manner. In one implementation, an applet computes a session key using a cryptography algorithm such as the Diffie-Hellman procedure. The session key encrypts the message and signature, and the encrypted message and signature are sent to the remote server 160. Upon receiving the encrypted message and signature, the remote server 160 decrypts the message.

After the message and signature are received in a secure manner, the remote server 160 determines whether the signature is correct in block P260. If the signature is correct, the remote server 160 will store the RQ, the RA or the hash of the RA, the number of PPQs (if included), the list of PPQs, and the pass phrase, as shown in block P270. In one embodiment, a data storage key may be implemented to encrypt the above listed data before they are stored, providing an extra level of protection. In another implementation, the remote server 160 returns an acceptance message to the client workstation 100 in the event that the signature is correct. If the signature is incorrect, the remote server 160 returns an error message to the client workstation 100, and the listed data are not stored, as shown in block P275.

Figure 3:
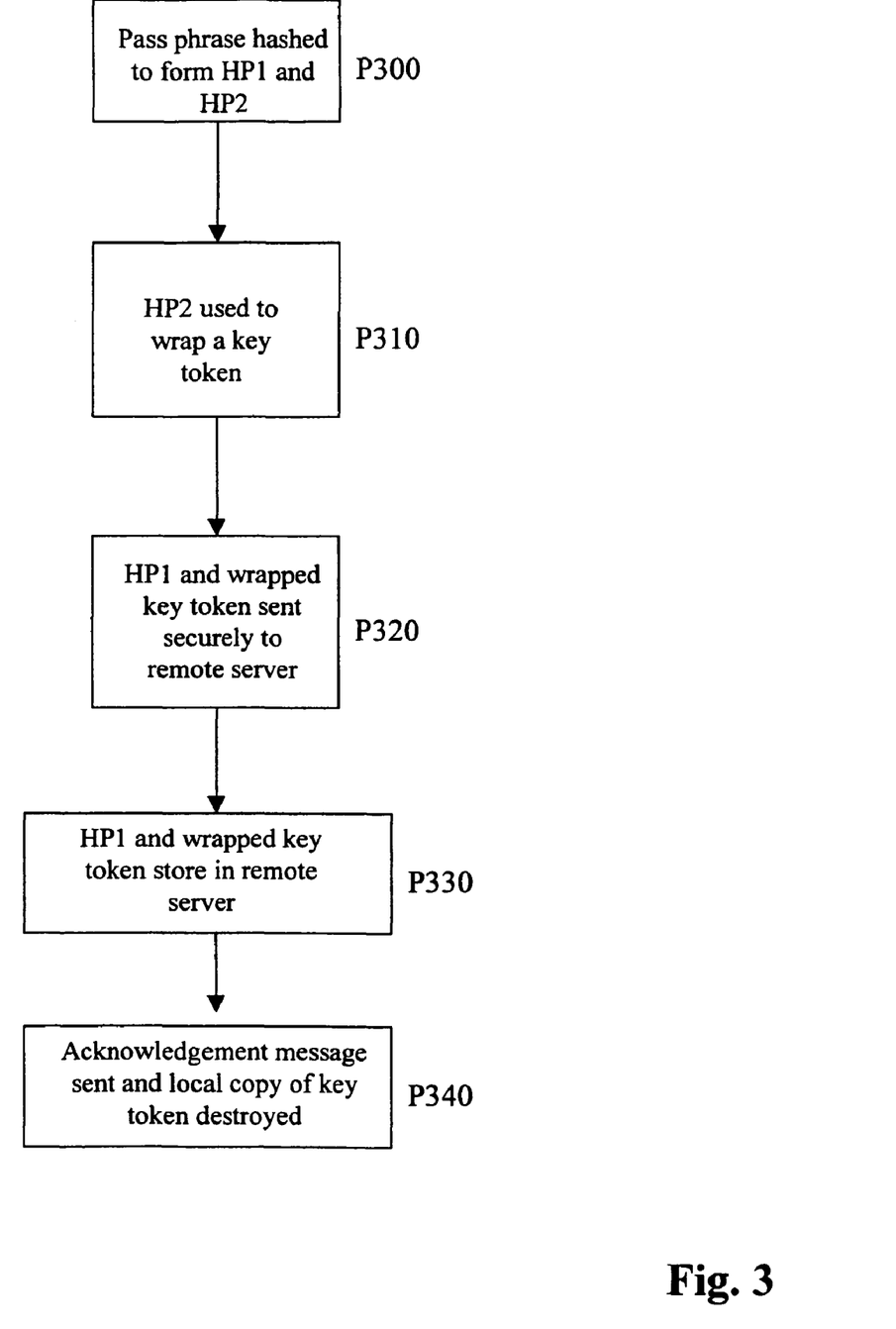
FIG. 3 illustrates an exemplary use of the pass phrase according to an embodiment of the invention.

FIG. 3 illustrates an exemplary use of the pass phrase according to an embodiment of the invention. In this example, the pass phrase is further processed by the client workstation 100 to wrap data before the data is sent to the remote server 160. In block P300, the pass phrase is hashed in two ways to form an identification key HP1 and an encryption key HP2 at the client work station 100. In one implementation, the HP1 is a public-private key pair, and is used in authenticating the user 120. In one implementation, the client program 105 contains two random numbers. The first random number and the pass phrase are input to a first hashing function, and the second random number and the pass phrase are input to a second hashing function. Based on these inputs, the first and second hashing functions generate HP1 and HP2, respectively.

In block P310, the HP2 is used to wrap the data. In one embodiment, the data is a key token that contains the user's private key and the user's certificate/credential. In another embodiment, HP2 is used only to wrap the user's private key and not the whole key token. In using the HP2 derived from the pass phrase, which in turn derives from the PPAs, the PPAs themselves are actually used to help protect the wrapped data, and not just to protect access to the wrapped data.

In block P320, the HP1 and the key token wrapped by the HP2 are sent securely to the remote server 160. In one implementation, a session key is created and a key exchange protocol is utilized to secure the transmission between the client workstation 100 and the remote server 160. The session key is a symmetric key and is used for securing a single session. At the client workstation 100, the session key encrypts the key token and HP1. Then, the encrypted key token and HP1 are sent to the remote server 160, where they are decrypted.

After the key token and HP1 are received by the remote server 160 in a secure manner, the remote server 160 stores the HP1 and the key token wrapped by the HP2, as shown in block P330. In one implementation, the HP1 and the key token are stored in a table or a database. The table or database may include entries relating to the DN or credential identification of possible users of the remote server 160, the HP1 associated with each of these possible users, and the user's private key wrapped by the HP2 associated with each of the users.

In block P340, the remote server 160 sends an acknowledgement message, which indicates that the HP1 and the key token have been stored, back to the client workstation 100. Upon receiving the acknowledgment message, the client workstation 100 destroys the local copy of the key token.

By storing only the concatenate and hash form of the PPAs in the remote server 160, actual PPAs is not stored on the remote server 160. All the answers to the PPQs are hashed together. By choosing good questions, the entropy can be high enough so that an exhaustive search over all of the answer space is infeasible. Even though the hash of the answers is known to the remote server 160, the actual answers remain unknown. Thus, an authorized user who breaks into or has access to the remote server 160 cannot simply obtain the PPAs to retrieve the sensitive or private information.

Figure 4:
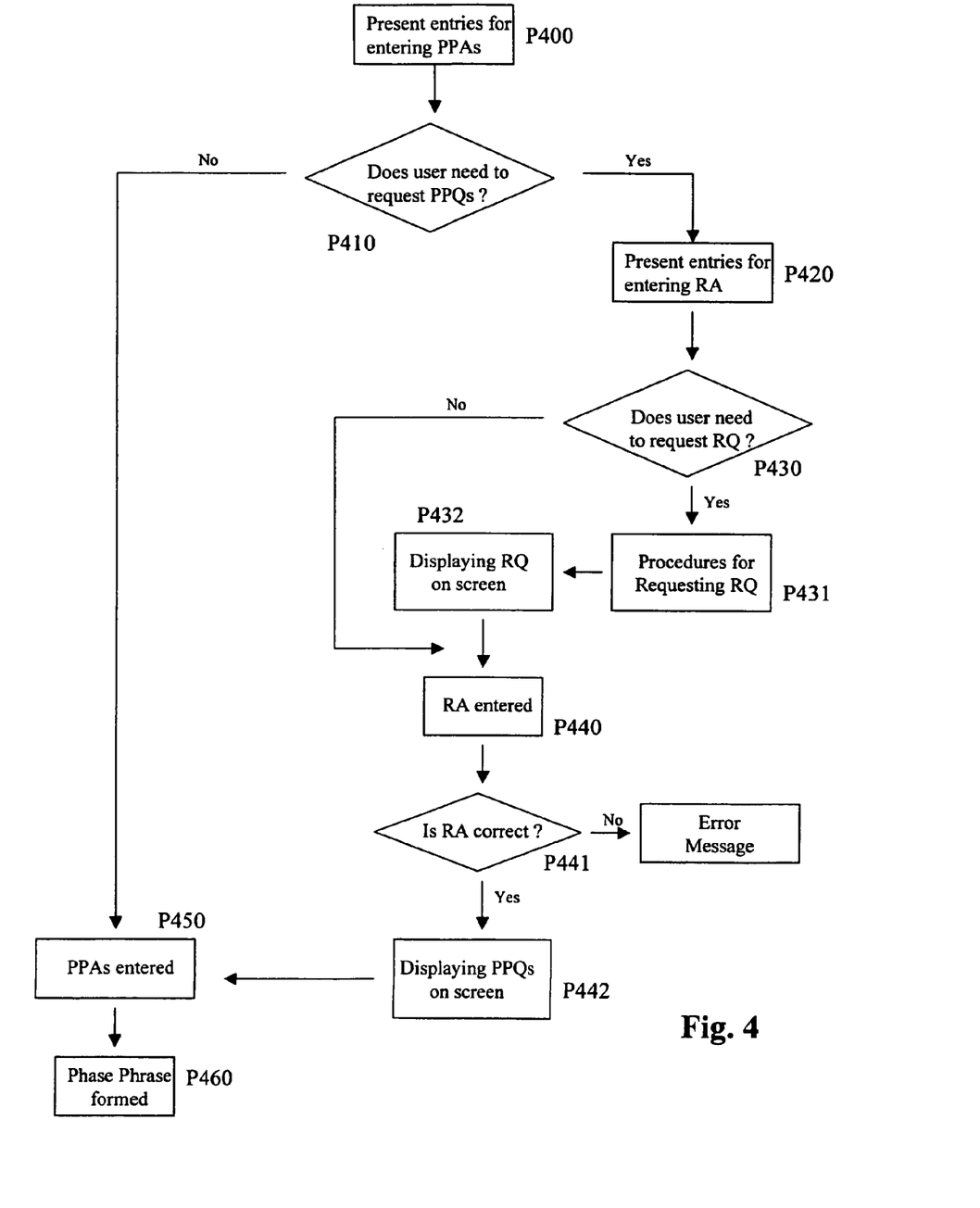
FIG. 4 illustrates processes for entering a pass phrase according to an embodiment of the present invention.

FIG. 4 illustrates processes for entering a pass phrase at a client workstation. From a client workstation 100, a user 120 contacts a content server 140 or a remote server 160. For example, the user may wish to access restricted information from the content server 140 or the remote server 160. In block P400, the user 120 is presented with a screen on the display 103 with k boxes, where k is the number of PPAs that are required, as shown in block P400. In one implementation, this number is determined from the number of the PPQs stored in the remote server 160. The screen on the display 103 also has an option for the user 120 to request the PPQs, in the event that the user 120 does not remember the PPAs of the top of his/her head.

In block P410, it is determined whether the user 120 needs to request PPQs by verifying whether the user 120 chooses to enter the PPAs immediately or chooses the requesting of PPQs option. If the user 120 does not need to request the PPQs and chooses to enter the PPAs immediately, the user 120 enters the PPAs in block P450. On the other hand, if the user 120 needs to request PPQs and chooses the requesting of PPQs option, the user is presented with a screen on the display 103 to enter the RA in block P420.

The screen on the display 103 also offers an option to request the RQ. In block P430, it is determined whether the user 120 needs to request the RQ by verifying whether the user 120 chooses to enter the RA immediately or chooses the requesting of RQ option. If the user 120 does not need to request the RQ and chooses to enter the RA immediately, the user 120 enters the RA in block P440. On the other hand, if the user 120 needs to request RQ and chooses the requesting of RQ option, procedures for requesting RA, including checking the user's identification information for authorization, are carried out in block P431. These procedures are described in more detail below. Upon receiving the RQ from the remote server 160, the user 120 is presented with a screen that contains the RQ and a box for entering the RA, as shown in block P432. In one implementation, an applet is used to achieve this presentation.

In block P440, the user 120 enters the RA. After the RA is entered, the procedures for requesting the PPQs are carried out. These procedures are described in more detail below. If the RA is correct and the requesting of the PPQs is successful, the user is presented with a screen on display 103 that contains PPQs and boxes for entering the PPAs, as shown in block P442. With the screen prompting the user 120 to enter the PPAs, the user 120 enters the PPAs in block P450. An applet concatenates the PPAs to form a pass phrase and return the pass phrase as the output of this procedure, as shown in block P460.

Figure 5:
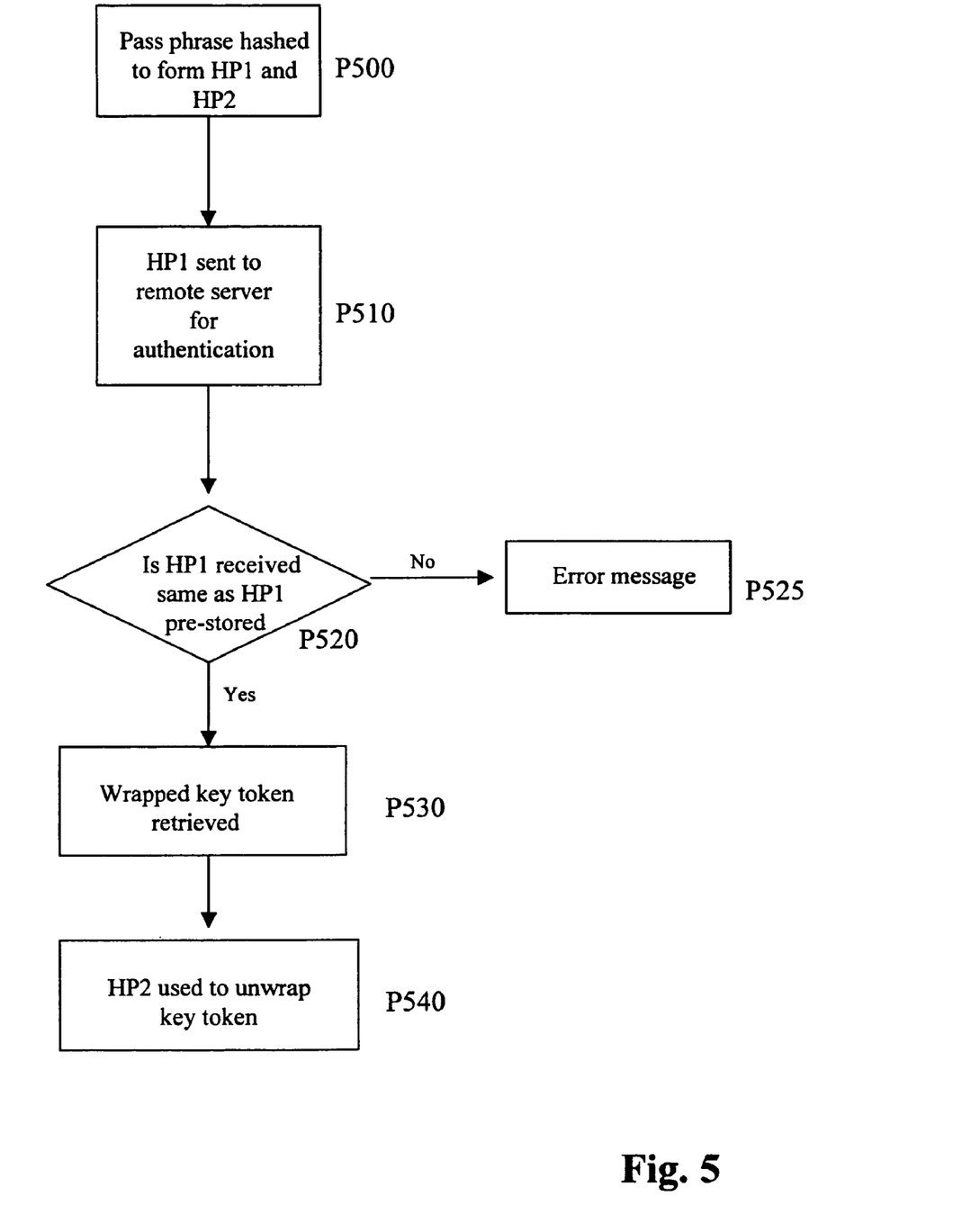
FIG. 5 illustrates an exemplary use of the pass phrase to retrieve data protected by the pass phrase according to an embodiment of the invention.

FIG. 5 illustrates an exemplary use of the pass phrase to retrieve data protected by the pass phrase according to an embodiment of the invention. In this example, the data protected by the pass phrase is illustrated by the user's private key or key token. In other embodiments, other kinds of data may be protected or the pass phrase may simply be used for authentication purpose. In block P500, the pass phrase generated from the PPAs entered by the user 120 is hashed to form HP1 and HP2 using the same hashing functions that were used when creating and registering the pass phrase (e.g., FIG. 3). In block P510, HP1 is sent to the remote server 160 for authentication. In block 520, the remote server 160 receives the HP1 and determines if authentication is successful by comparing the HP1 received with the HP1 pre-stored in a table or database. In one implementation, the remote server 160 authenticates the user by matching the transmitted HP1 to the corresponding value in the table or database.

If the received HP1 is different from the pre-stored HP1, indicating that the PPAs entered are incorrect, an error message is sent to the user 120, as shown in block P525. In one implementation, the user is asked to enter the PPAs again, with the option to request the PPQs if needed. On the other hand, if the authentication is successful, the user's wrapped key token or user's key token with wrapped private key is sent back to the user 120 at the client workstation 100, as shown in block P530.

In block P540, upon receiving the wrapped key token, the client workstation 100 uses HP2 as the key to unwrap the key token through a decryption algorithm. The algorithm is the same algorithm used to wrap the private key initially, such as the Data Encryption Standard algorithm. This allows the user 120 to recover the data. In this example, roaming credential and the private key are recovered. With the private key and credential/certificate in hand, the user 120 can utilize the secure communication channel. Having the digital credential, the content server 140 can now obtain the credential management facility's authentication of the user's credentials.

Figure 6:
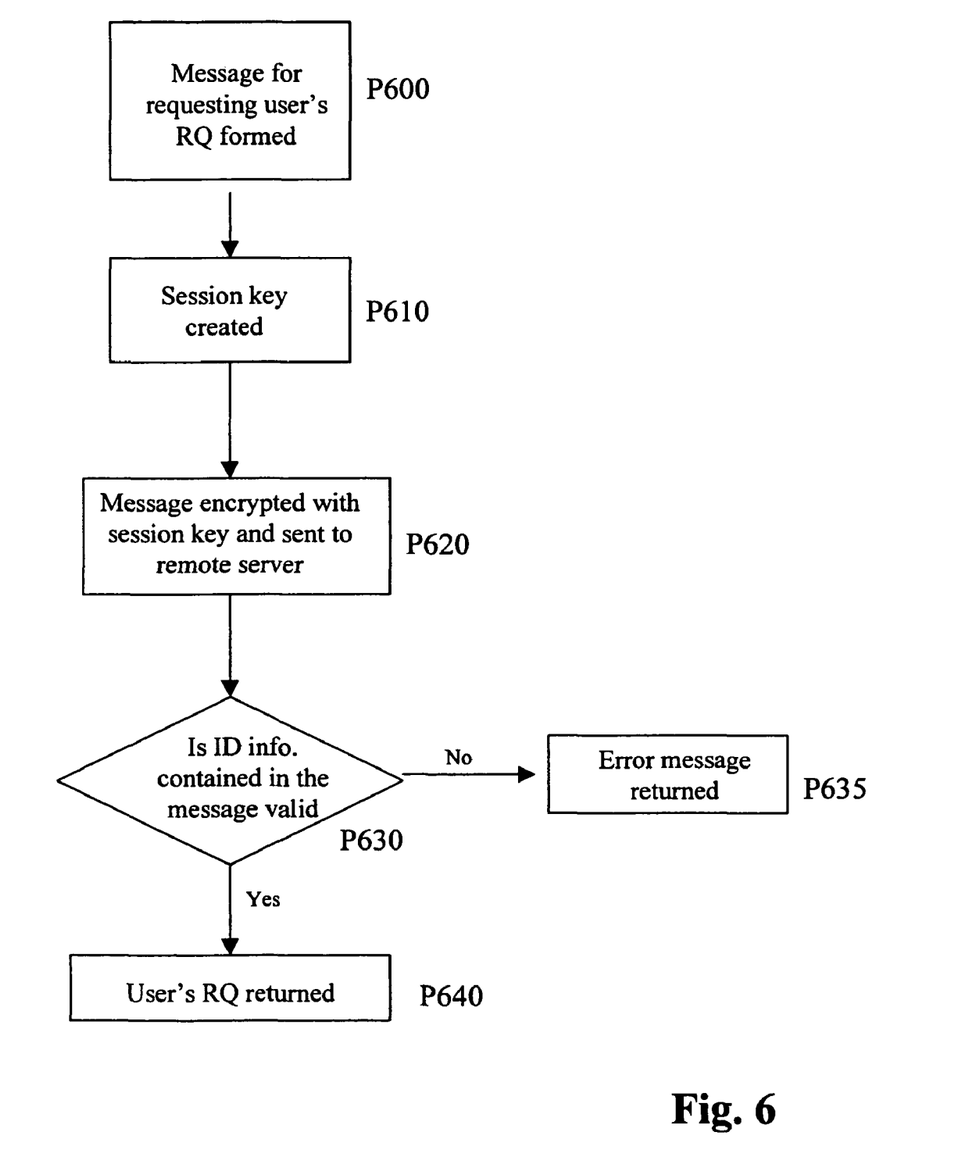
FIG. 6 illustrates in more detail the procedures for requesting a retrieval question in the processes shown in FIG. 4 according to an embodiment of the present invention.

FIG. 6 illustrates in more detail the procedures for requesting a RQ according to an embodiment of the present invention. After the client workstation 100 determines that the user needs to request RQ before proceeding, a local applet forms a request for RQ message, the message containing identification information, as shown in block P600. In one implementation, the identification information may be the DN or credential identification. The identification information is used to check the identity of the user 120 to make sure that the user 120 is an authorized user. In block P610, a local applet creates a session key using a cryptography algorithm such as the Diffie-Hellman procedure. The applet encrypts the request for RQ message using the session key and sends it to the remote server 160, as shown in block P620.

Upon receiving the request for RQ message, the remote server 160 decrypts the message and determines if the identification information indicates an authorized user, as shown in block P630. In one implementation, the remote server 160 will check the DN or credential identification contained in the request for RQ message against the DN or credential pre-stored in the remote server 160. For example, the pre-stored DN or credential may be obtained when the user registered with the remote server 160 and may be stored in a table or database contained in the remote server 160. If the identification information is not valid, as shown in block P635, an error message is returned to the user and the user is asked to send another request for the RQ using different identification information.

If the identification information is valid, the remote server 160 returns the RQ associated with the user 120, the RQ being encrypted with the session key, as shown in block P640. Like all transactions, this event will be recorded in an event log of the credential. In one implementation, the remote server 160 returns the RQ based on the identification information received, which is mapped to an RQ in a table or database pre-stored in the remote server 160. Upon receiving the encrypted RQ, the client workstation 100 decrypts the RQ using the session key, allowing the RQ to be displayed on the display 103.

All communication between the user and the server can be encrypted using a similar or some other method.

Figure 7:
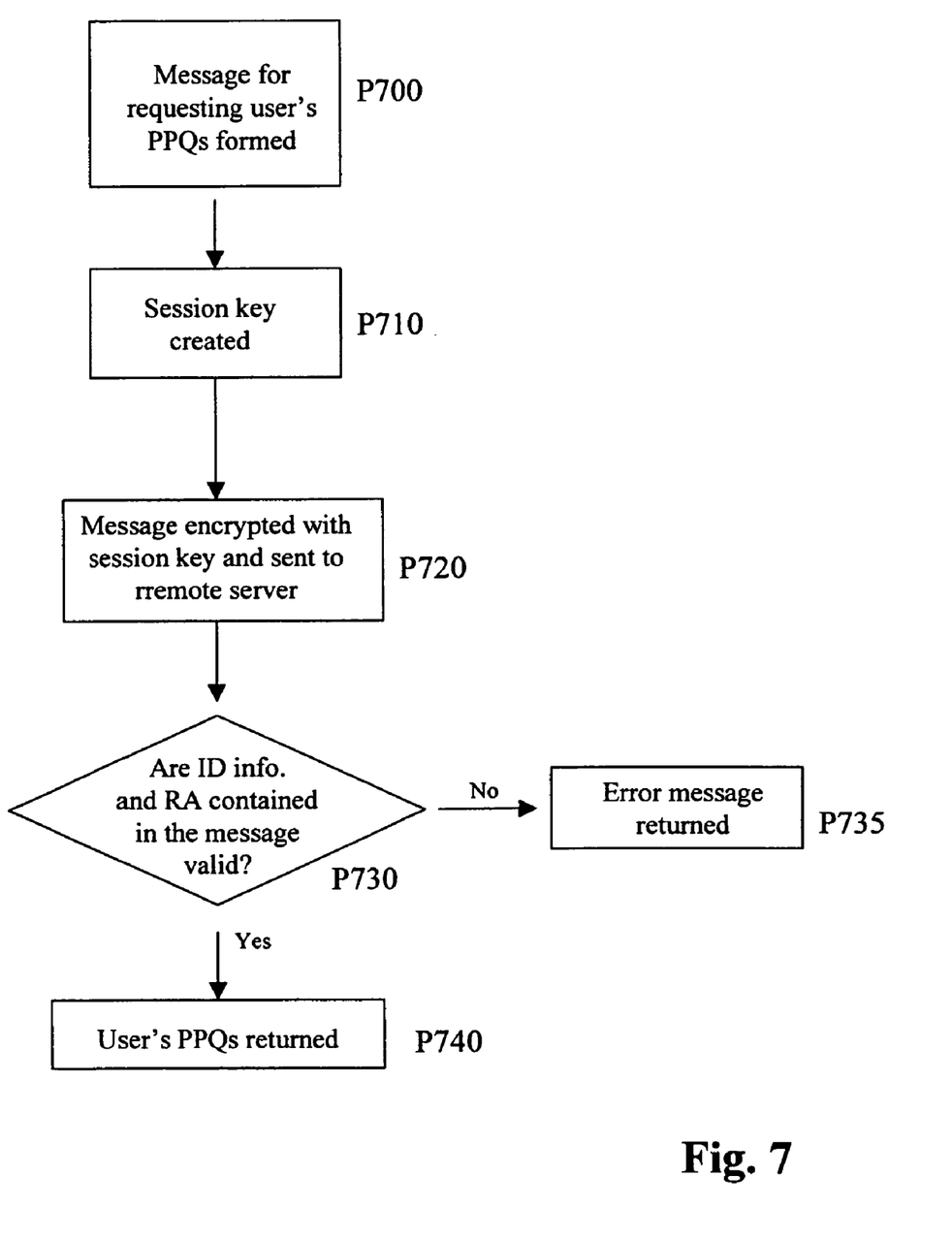
FIG. 7 illustrates in more detail the procedures for determining whether a retrieval answer is correct in the processes shown in FIG. 4 according to an embodiment of the present invention.

FIG. 7 illustrates in more detail the procedures for determining if the RA entered by the user 120 is correct and requesting PPQs, according to an embodiment of the present invention. After the user 120 enters the RA, a local applet forms a request for PPQs message, the message containing identification information and the RA, as shown in block P700. In one implementation, the identification information may be the DN or credential identification. In block P710, a local applet creates a session key using a cryptography algorithm such as the Diffie-Hellman procedure. The applet encrypts the request for PPQs message and sends it to the remote server 160, as shown in block P720.

Upon receiving the request for PPQs message, the remote server 160 decrypts the message and determines if the identification information indicates an authorized user and if the RA is correct, as shown in block P730. In one implementation, the remote server 160 will check the DN or credential identification contained in the request for RQ message against the DN or credential pre-stored in the remote server 160.

If the identification information or the RA is not valid, as shown in block P735, an error message is returned to the user.

Depending on the situation, the user 120 may be asked to send another request for the PPQs using different identification information, or the user may be asked to enter another RA, or both. In one embodiment, if the user 120 fails consecutively to enter the correct RA or the identification information, the remote server 160 begins to increase the delay time between allowed credential attempts for the user 120.

If the identification information and the RA are valid, the remote server 160 returns the PPQs associated with the user 120, the PPQs being encrypted with the session key, as shown in block P740. Like all transactions, this event will be recorded in an event log of the credential. In one implementation, the remote server 160 returns the PPQs based on the identification information, which is mapped to a set of PPQs in a table or database pre-stored in the remote server 160. Upon receiving the encrypted PPQs, the client workstation 100 decrypts the PPQs using the session key, allowing the PPQs to be displayed on the display 103.

According to an embodiment of the invention, the system and method described above further provides the feature of notifying the user 120 when anyone asks for the user's RQ. Such notification may be accomplished through various communication means. For example, an e-mail, an instant message, a page, or a facsimile may be sent to the user 120. The user 120 is provided with the feature to immediately change the user's RQ if the person who requested the RQ is not the user 120. The person, without knowledge of the RA to the new RQ, will not be able to obtain the PPQs. In one implementation, if a user is bothered by someone who constantly asks for the user's RQ, the user could put in a null question.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A computer-implemented method of providing a pass phrase at a client workstation, the computer-implemented method causing the client workstation to:
    display, at the client workstation, a plurality of fields for entering a plurality of pass phrase answers without displaying a plurality of pass phrase questions,
    receive, at the client workstation, the plurality of pass phrase answers; and
    combine, at the client workstation, the plurality of pass phrase answers into a single pass phrase, wherein the plurality of pass phrase answers are concatenated together with a fixed random value and a cryptographic hash function is applied to the concatenation to generate the single pass phrase.

2. The computer-implemented method of claim 1, further causing the client workstation to
    display a message indicating that a retrieval question has been requested.

3. A client workstation comprising:
    a processor; a display connected to the processor;
    a computer memory connected to the processor, the computer memory including:
    a viewing program for rendering information received from a server on the display, the display displaying a plurality of fields for entering a plurality of pass phrase answers without displaying a plurality of pass phrase questions, and an option for requesting the plurality of pass phrase questions corresponding to the plurality of the pass phrase of answers,
    and a client program for combining the pass phrase answers to form a single pass phrase, wherein if the option for requesting the set of the pass phrase questions is chosen, a field for entering a retrieval answer and an option for requesting a retrieval question corresponding to the retrieval answer is displayed.

4. The client workstation of claim 3,
    wherein if the option for requesting the retrieval question is chosen, the client program forms a request, transmits the request to the server and receives the retrieval question from the server;
    the viewing program displays the retrieval question;
    the client program receives an input retrieval answer and transmits the input retrieval answer to the server for verification and receives the pass phrase questions if the input retrieval answer is valid; and
    the viewing program displays the pass phrase questions.

5. A client workstation comprising:
    a processor; a display connected to the processor; a computer memory connected to the processor, the computer memory including:
    a viewing program for rendering information received from a server on the display, the display displaying a plurality of fields for entering a plurality of pass phrase answers without displaying a plurality of pass phrase questions,
    and an option for requesting the plurality of pass phrase questions corresponding to the plurality of the pass phrase of answers, and :
    a client program for combining the pass phrase answers to form a single pass phrase, wherein the plurality of pass phrase answers are concatenated together with a fixed random value and a cryptographic hash function is applied to the concatenation to generate the single pass phrase.

6. The computer-implemented method of claim 1, the computer-implemented method further causing the client workstation to:
    retrieve and display, if the input for displaying pass phrase questions is received, at least one field for entering a retrieval answer.

7. The computer-implemented method of claim 6, the computer-implemented method further causing the client workstation to
    receive an inputted retrieval answer;
    verify the inputted retrieval answer matches the stored retrieval answer; and
    display a plurality of pass phrase questions if the inputted retrieval answer matches a stored retrieval answer.

8. The computer-implemented method of claim 6, the computer-implemented method further causing the client workstation to:
    display an option for displaying a retrieval question;
    display the retrieval question if input is received selecting the option for displaying the retrieval question;
    receive a retrieval answer corresponding to the displayed retrieval question;
    verify the received retrieval answer matches a stored retrieval answer; and
    display the plurality of pass phrase questions if the received retrieval answer matches the stored retrieval answer.

9. The client workstation of claim 3,
the display displaying, if the input for displaying pass phrase questions is received, at least one field for entering a retrieval answer.

10. The client workstation of claim 9, further including:
the client program for receiving an inputted retrieval answer;
the display displaying a plurality of pass phrase questions if the inputted retrieval answer matches a stored retrieval answer.

11. The client workstation of claim 9,
the display displaying an option for displaying a retrieval question, displaying the retrieval question if input is received selecting the option for displaying the retrieval question; and display the plurality of pass phrase questions if the received retrieval answer matches a stored retrieval answer.

\* \* \* \* \*